US012412084B2

(12) United States Patent
Fujimura et al.

(10) Patent No.: US 12,412,084 B2
(45) Date of Patent: Sep. 9, 2025

(54) INFORMATION PROCESSING DEVICE, INFORMATION PROCESSING METHOD, AND RECORDING MEDIUM

(71) Applicant: Panasonic Intellectual Property Corporation of America, Torrance, CA (US)

(72) Inventors: Ryota Fujimura, Kanagawa (JP); Yohei Nakata, Osaka (JP); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 930 days.

(21) Appl. No.: 17/152,155

(22) Filed: Jan. 19, 2021

(65) Prior Publication Data

US 2021/0166139 A1      Jun. 3, 2021

Related U.S. Application Data

(63) Continuation of application No. PCT/JP2019/048321, filed on Dec. 10, 2019.
(Continued)

(30) Foreign Application Priority Data

Jun. 10, 2019    (JP) ................ 2019-107878

(51) Int. Cl.
*G06N 3/08*      (2023.01)
*G06F 18/21*      (2023.01)
(Continued)

(52) U.S. Cl.
CPC ............... *G06N 3/08* (2013.01); *G06F 18/21* (2023.01); *G06F 18/2415* (2023.01);
(Continued)

(58) Field of Classification Search
CPC ............. G06N 3/08; G06N 20/00; G06N 5/04
See application file for complete search history.

(56) References Cited

U.S. PATENT DOCUMENTS 11,599,744 B2 *   3/2023   Sharma ................ G06V 10/17
2004/0150602 A1    8/2004   Furukawa et al.
(Continued)

FOREIGN PATENT DOCUMENTS

JP      2004-212598      7/2004
JP      2015-521483      7/2015
(Continued)

OTHER PUBLICATIONS

Johannes Balle, "End-to-End Optimized Image Compression", 2017 (Year: 2017).*
(Continued)

*Primary Examiner* — Van C Mang
(74) *Attorney, Agent, or Firm* — Wenderoth, Lind & Ponack, L.L.P.

(57) ABSTRACT

An information processing device includes a processor. The processor obtains a first classification threshold for classifying data into at least one of a plurality of classes, and outputs a classification result of classifying the data into at least one of the plurality of classes based on an output of a trained classification model and the first classification threshold. The first classification threshold is obtained by a second transform performed on a second classification threshold, the second transform being an inverse transform of a first transform. The first transform corresponds to transforming the output of the trained classification model into a classification probability value of each of a plurality of unit classes constituting the plurality of classes. The second classification threshold is set based on the classification probability values of the plurality of unit classes.

6 Claims, 10 Drawing Sheets

Related U.S. Application Data

(60) Provisional application No. 62/787,576, filed on Jan. 2, 2019.

(51) Int. Cl.
  *G06F 18/2415* (2023.01)
  *G06F 18/2431* (2023.01)
  *G06N 5/04* (2023.01)
  *G06N 20/00* (2019.01)
  *G06V 10/764* (2022.01)

(52) U.S. Cl.
  CPC .......... *G06F 18/2431* (2023.01); *G06N 5/04* (2013.01); *G06N 20/00* (2019.01); *G06V 10/764* (2022.01)

(56) References Cited

U.S. PATENT DOCUMENTS

| | | |
|---|---|---|
| 2015/0176072 A1 | 6/2015 | Wang et al. |
| 2018/0137421 A1 | 5/2018 | Takeda et al. |
| 2019/0034516 A1* | 1/2019 | Jiang .................. G06F 16/2228 |

FOREIGN PATENT DOCUMENTS

| | | |
|---|---|---|
| JP | 2018-77765 | 5/2018 |
| WO | 2013/192616 | 12/2013 |
| WO | 2017/133569 | 8/2017 |
| WO | 2017/149722 | 9/2017 |
| WO | 2018/105194 | 6/2018 |

OTHER PUBLICATIONS

Dan Ciresan, "Multi-column Deep Neural Networks for Image Classification" (Year: 2012).*
International Search Report (ISR) issued on Feb. 4, 2020 in International (PCT) Application No. PCT/JP2019/048321.
Extended European Search Report issued Jan. 31, 2022 in corresponding European Patent Application No. 19907653.0.

* cited by examiner

INFORMATION PROCESSING DEVICE, INFORMATION PROCESSING METHOD, AND RECORDING MEDIUM

CROSS REFERENCE TO RELATED APPLICATIONS

This is a continuation application of PCT International Application No. PCT/JP2019/048321 filed on Dec. 10, 2019, designating the United States of America, which is based on and claims priority of Japanese Patent Application No. 2019-107878 filed on Jun. 10, 2019 and U.S. Provisional Patent Application No. 62/787,576 filed on Jan. 2, 2019. The entire disclosures of the above-identified applications, including the specifications, drawings and claims are incorporated herein by reference in their entirety.

FIELD

The present disclosure relates to an information processing device, an information processing method, and a recording medium.

BACKGROUND

In fields such as image recognition, multilayer neural networks (Deep Neural Networks, or "DNNs") are used as a recognition model (also called a "classification model" hereinafter) to recognize objects in images. A DNN, for example, takes an image as an input, and outputs a probability value of an object in the Image being classified into a class (also called a "likelihood" of an object class). In this case, a Softmax function is used in an output layer of the DNN (for example, see PTL 1).

CITATION LIST

Patent Literature

PTL 1: International Publication No. 2017/149722

SUMMARY

Technical Problem

However, a Softmax function involves exponential computations, which may place a strain on computational resources when the classification model is implemented on embedded devices having limited computational resources.

Accordingly, the present disclosure provides an Information processing device, an information processing method, and a recording medium capable of reducing an amount of computations for classifying an object into a class.

Solution to Problem

To solve the above-described problem, an information processing device according to one aspect of the present disclosure is an information processing device including a processor. The processor is configured to obtain a first classification threshold for classifying data into at least one of a plurality of classes, and output a classification result of classifying the data into at least one of the plurality of classes based on an output of a trained classification model and the first classification threshold. The first classification threshold is obtained by a second transform performed on a second classification threshold, the second transform being an inverse transform of a first transform. The first transform corresponds to transforming the output of the trained classification model into a classification probability value of each of a plurality of unit classes constituting the plurality of classes. The second classification threshold is set based on the classification probability values of the plurality of unit classes.

Additionally, an information processing method according to one aspect of the present disclosure is an information processing method executed by a computer. The information processing method includes: executing a first transform from an output of a trained classification model into a classification probability value of each of a plurality of unit classes; setting a second classification threshold based on the classification probability values of the plurality of unit classes; executing a second transform, the second transform being a transform from the second classification threshold into a first classification threshold for classifying data into at least one of a plurality of classes, and the second transform being an inverse transform of the first transform; and outputting the first classification threshold.

Additionally, a recording medium according to one aspect of the present disclosure is a non-transitory computer-readable recording medium having a program recorded thereon for causing a computer to execute an information processing method. The information processing method includes: obtaining a first classification threshold for classifying data into at least one of a plurality of classes; and outputting a classification result of classifying the data into at least one of the plurality of classes based on an output of a trained classification model and the first classification threshold. The first classification threshold is obtained by a second transform performed on a second classification threshold, the second transform being an inverse transform of a first transform. The first transform corresponds to transforming the output of the trained classification model into a classification probability value of each of a plurality of unit classes. The second classification threshold is set based on the classification probability values of the plurality of unit classes.

Advantageous Effects

According to the present disclosure, the amount of computations for classifying an object into a class can be reduced.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
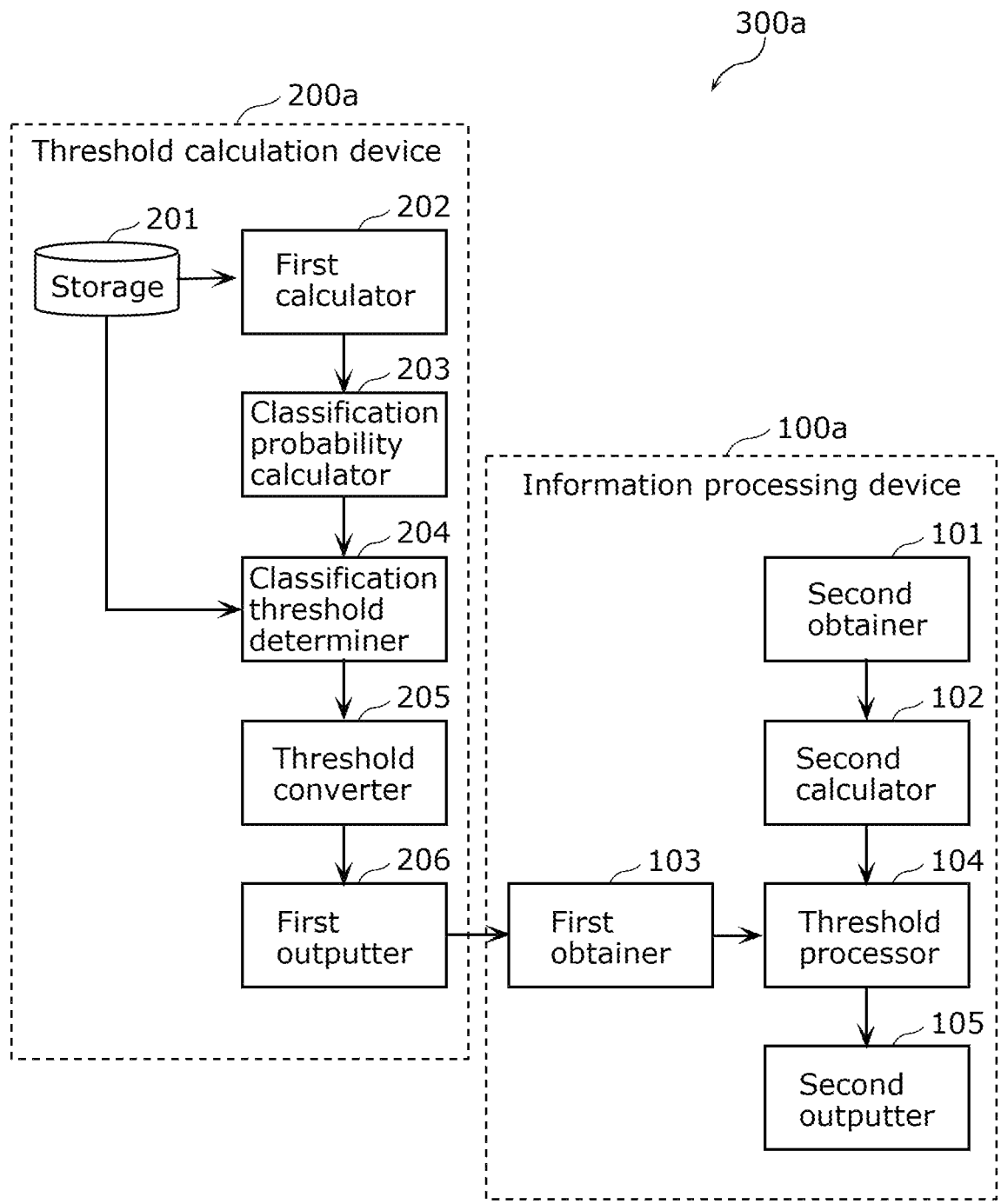
FIG. 1 is a block diagram illustrating an example of the configuration of an information processing system according to Embodiment 1.

DESCRIPTION OF EMBODIMENTS (Underlying Knowledge Leading to Present Disclosure)

Thus far, multilayer neural networks (Deep Neural Networks, "DNNs") implemented in computing devices with limited computational resources, such as embedded devices, have had an issue in that the number of hidden layer units cannot be Increased, which causes a drop in pattern recognition performance. In response to this issue, the past technique described in PTL 1 determines whether or not to perform scalar quantization in each layer of a DNN, and in the next layer after the layer in which scalar quantization is performed, multiplies the scalar-quantized vector with a weight vector. This makes it possible to reduce the amount of computations more than when multiplying a non-scalar-quantized vector and the weight vector, which in turn makes it possible to increase the number of hidden layer units. However, a likelihood vector is calculated using a scalar-quantized output vector, and thus the values are coarser than when calculating the likelihood vector using a non-scalar-quantized output vector. The recognition accuracy may drop as a result.

In the past technique described in PTL 1, when scalar quantization has not been performed in the layer one previous to the output layer of the DNN, a Softmax function is applied in the output layer to calculate a likelihood vector ("classification probability value" hereinafter) for a plurality of classes. The Softmax function involves the computation of exponential functions, and thus the amount of computations of exponential functions becomes an issue when implemented in embedded systems. Furthermore, a Softmax function adjusts a sum to be 1 with respect to the input, and thus original values cannot be restored even through Inverse transforms. In other words, because the Softmax function performs an irreversible computation on the input, a non-normalized value cannot be obtained by performing an inverse transform on the output value obtained in response to the input to the Softmax function. Therefore, in the past technique described in PTL 1, it is necessary, for example, to calculate a classification probability value for each of a plurality of classes of objects in an input Image in order to identify an object in the input image. Such a process of calculating the classification probability value of an object in an input image increases the amount of computations in computing devices with limited computational resources, such as embedded devices, and may therefore reduce the recognition accuracy of DNNs implemented in such computing devices. It is therefore difficult to say that the past technique described in PTL 1 is able to reduce the amount of computations for classifying objects into classes.

After diligently examining the above-described issue, the inventors of the present disclosure found that, in the process of determining a threshold for each of a plurality of classes, performing a reversible transform at the output layer of the DNN makes it possible to perform an inverse transform on the calculated threshold and obtain a non-normalized threshold. The inventors therefore arrived at an information processing device that, for example, can use a non-normalized threshold in a process of classifying objects in an input image into classes, which makes it possible to reduce the amount of computations for classifying objects into classes.

An overview of one aspect of the present disclosure is as follows.

An information processing device according to one aspect of the present disclosure is an information processing device including a processor. The processor is configured to obtain a first classification threshold for classifying data into at least one of a plurality of classes, and output a classification result of classifying the data into at least one of the plurality of classes based on an output of a trained classification model and the first classification threshold. The first classification threshold is obtained by a second transform performed on a second classification threshold, the second transform being an inverse transform of a first transform. The first transform corresponds to transforming the output of the trained classification model into a classification probability value of each of a plurality of unit classes constituting the plurality of classes. The second classification threshold is set based on the classification probability values of the plurality of unit classes.

According to the above-described configuration, an inverse-transformable function is used in the first transform the transforms from the output of the classification model into the classification probability values of the plurality of unit classes. Accordingly, when the first classification threshold, which is obtained by executing the second transform that is an inverse transform of the first transform on the second classification threshold, is used in processing for classifying an object into a class, it is no longer necessary to convert the output of the classification model, which takes, for example, an image as an input, into the classification probability values of the plurality of unit classes. An information processing device according to one aspect of the present disclosure can therefore reduce the amount of computations performed for classifying an object into a class.

Specifically, in an information processing device according to one aspect of the present disclosure, the output of the trained classification model may be a plurality of scalars corresponding to the plurality of classes.

Additionally, an information processing method according to one aspect of the present disclosure is an information processing method executed by a computer. The information processing method includes: executing a first transform from an output of a trained classification model into a classification probability value of each of a plurality of unit classes; setting a second classification threshold based on the classification probability values of the plurality of unit classes; executing a second transform, the second transform being a transform from the second classification threshold into a first classification threshold for classifying data into at least one of a plurality of classes, and the second transform being an inverse transform of the first transform; and outputting the first classification threshold.

According to the above-described method, an inverse-transformable function is used in the first transform the transforms from the output of the classification model into the classification probability values of the plurality of unit classes. As such, the first classification threshold, which is a non-normalized threshold, is obtained by executing the second transform, which is an inverse transform of the first transform, on the second classification threshold. For example, if the first classification threshold is used in processing for classifying an object into a class, it is no longer necessary to convert the output of the classification model into the classification probability values of the plurality of unit classes. Accordingly, according to the Information processing method according to one aspect of the present disclosure, the first classification threshold, which is a non-normalized threshold, is obtained, which makes it possible to reduce the amount of computations performed for classifying an object into a class.

For example, in an Information processing method according to one aspect of the present disclosure, the first transform may be a computation by an inverse-transformable probability function, and the second transform may be a computation by an inverse function of the inverse-transformable probability function.

Accordingly, by inverse-transforming the classification probability values of the plurality of unit classes, pre-transform values, i.e., the output of the trained classification model, can be derived.

For example, in an information processing method according to one aspect of the present disclosure, the first transform may be a database corresponding to a computation by an inverse-transformable probability function, and the second transform may be a database corresponding to a computation by an inverse function of the inverse-transformable probability function.

This makes it possible to further reduce the amount of calculations than when using function computations.

For example, an information processing method according to one aspect of the present disclosure may further include: obtaining a data set; obtaining the classification probability value of each of the plurality of unit classes for each of data included in the data set by inputting the data set into the trained classification model; and determining the second classification threshold based on a classification result obtained by using the second classification threshold on each obtained classification probability value of each of the plurality of unit classes.

Through this, a classification probability value threshold for the classification probability values of the plurality of unit classes, i.e., the second classification threshold, is shifted with reference to correct answer data contained in the data set for evaluation, and a second classification threshold which satisfies a target accuracy is selected. Therefore, with the information processing method according to one aspect of the present disclosure, a threshold at which a desired classification accuracy is obtained can be determined.

Additionally, a recording medium according to one aspect of the present disclosure is a non-transitory computer-readable recording medium having a program recorded thereon for causing a computer to execute an information processing method. The information processing method includes: obtaining a first classification threshold for classifying data into at least one of a plurality of classes; and outputting a classification result of classifying the data into at least one of the plurality of classes based on an output of a trained classification model and the first classification threshold. The first classification threshold is obtained by a second transform performed on a second classification threshold, the second transform being an inverse transform of a first transform. The first transform corresponds to transforming the output of the trained classification model into a classification probability value of each of a plurality of unit classes. The second classification threshold is set based on the classification probability values of the plurality of unit classes.

According to the above-described recording medium, an inverse-transformable function is used in the first transform the transforms from the output of the classification model into the classification probability values of the plurality of unit classes. Accordingly, when the first classification threshold, which is obtained by executing the second transform that is an inverse transform of the first transform on the second classification threshold, is used in processing for classifying an object into a class, it is no longer necessary to convert the output of the classification model, which takes, for example, an image as an input, into the classification probability values of the plurality of unit classes. A recording medium according to one aspect of the present disclosure can therefore reduce the amount of computations performed for classifying an object into a class.

Embodiments of the present disclosure will be described hereinafter with reference to the drawings.

Note that the following embodiments describe comprehensive or specific examples of the present disclosure. The numerical values, shapes, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims will be described as optional constituent elements.

Additionally, the drawings are schematic diagrams, and are not necessarily exact illustrations. As such, the scales and so on, for example, are not necessarily consistent from drawing to drawing. Furthermore, configurations that are substantially the same are given the same reference signs in the drawings, and redundant descriptions will be omitted or simplified.

Additionally, in the present specification, terms indicating relationships between elements, such as "horizontal" or "vertical", and numerical value ranges do not express the items in question in the strictest sense, but rather include substantially equivalent ranges, e.g., differences of several percent, as well.

Embodiment 1

Overview of Information Processing System

First, an overview of an information processing system including an information processing device according to Embodiment 1 will be described with reference to the drawings. FIG. 1 is a block diagram illustrating an example of the configuration of information processing system 300*a* according to Embodiment 1.

Information processing system 300*a* is a system that classifies data obtained by a sensor into at least one of a plurality of classes and outputs a classification result. Information processing system 300*a* includes threshold calculation device 200*a*, which calculates a first classification threshold for classifying the data into at least one of the plurality of classes, and Information processing device 100*a*, which based on an output of a trained classification model and the first classification threshold, outputs a classification result in which the data has been classified into at least one of the plurality of classes.

The sensor is, for example, a sound sensor such as a microphone, an image sensor, a range sensor, a gyrosensor, a pressure sensor, or the like. Data obtained using a plurality of sensors may be obtained using a three-dimensional reconstruction technique such as SfM (Structure from Motion), for example. The data obtained by the sensor is, for example, audio, an image, a moving image, three-dimensional point cloud data, or vector data.

In Information processing system 300a, a plurality of classes that classify the data may be set in accordance with the type of the data, the application of the data, or the like. For example, if the data is audio, classes such as the voice of a specific person, the operation sound of a specific machine, or the cry of a specific animal may be set. If the data is an image, in a surveillance camera system, for example, a class such as a specific person may be set, and in an in-vehicle camera system, for example, a class such as pedestrian, automobile, motorcycle, bicycle, background, and the like may be set. If the data is three-dimensional point cloud data, for example, a class such as unevenness or cracks in a structure or terrain, or a specific structure, may be set from the three-dimensional shape of a structure or terrain. Finally, if the data is vector data, for example, a class such as motion vectors at a plurality of parts of a structure, such as bridge girders or soundproof walls, may be set.

Each element of information processing system 300a will be described below.

Threshold Calculation Device

Threshold calculation device 200a is a device for calculating a first classification threshold for classifying data into at least one of a plurality of classes.

As illustrated in FIG. 1, threshold calculation device 200a includes storage 201, first calculator 202, classification probability calculator 203, classification threshold determiner 204, threshold converter 205, and first outputter 206.

Storage 201 stores a data set for evaluation of a second classification threshold. The data set for evaluation includes a set of input data to be input to first calculator 202 and correct answer data corresponding to the input data. The correct answer data are a classification probability value for each of a plurality of classes of the input data. Hereinafter, the classification probability values for each of the plurality of classes will also be referred to as classification probability values for a plurality of unit classes. "Unit class" refers to each class constituting the plurality of classes. The classification probability value of a plurality of unit classes is a normalized probability value obtained by classification probability calculator 203 performing a first transform on an output of first calculator 202. The second classification threshold is set based on the classification probability values of the plurality of unit classes.

First calculator 202 is a feature amount extractor that extracts a feature amount of the data, e.g., a machine learning model. For example, first calculator 202 is a trained classification model. The classification model is a multilayer neural network (DNN). First calculator 202 obtains the data set for evaluation. For example, first calculator 202 reads out the data set for evaluation from storage 201. The input data of the data set for evaluation is input to first calculator 202. First calculator 202 outputs a plurality of scalars corresponding to the plurality of classes of the input data. Each scalar is a feature amount that corresponds to a respective class of the input data. The output of first calculator 202 is a non-normalized value.

Note that first calculator 202 is not limited to a DNN. For example, first calculator 202 may be a feature amount extractor, aside from a DNN, that uses a method such as edge extraction, primary component analysis, block matching, or a sampling moiré method.

Note that first calculator 202 may obtain the data set for evaluation from another device through communication. For example, the data set for evaluation may be obtained from a server or storage over the Internet.

Classification probability calculator 203 performs the first transform, which is a transform of the output of first calculator 202 to classification probability values of the plurality of unit classes. More specifically, in the first transform, classification probability calculator 203 calculates the classification probability values of the plurality of unit classes from the output of first calculator 202 using a reversible transform. For example, classification probability calculator 203 derives classification probability values corresponding to the plurality of classes of input data by normalizing a plurality of scalars (feature amounts) corresponding to the plurality of classes of input data using a probability function that can be inverse-transformed. By performing normalization using a reversible transform in this manner, a non-normalized threshold can be derived by inverse-transforming a suitable threshold after determining the suitable threshold (the second classification threshold; described later) based on the data set for evaluation.

Classification probability calculator 203 is constituted by, for example, probability calculators of a plurality of unit classes. Each of the plurality of scalars corresponding to the plurality of classes is input to the probability calculator of the corresponding unit class among the plurality of classes. Each of the probability calculators of the plurality of unit classes is an inverse-transformable function. These functions may be different from each other, or may be the same. The inverse-transformable function may be a differentiable function, e.g., a sigmoid function, a tangent hyperbolic function (Tan h), or the like. Note that the first transform may be a computation performed using an inverse-transformable probability function, or may be a transform performed using a database corresponding to a computation performed using an inverse-transformable probability function. The database may be a table in which inputs and outputs (post-transform values) are mapped to each other, such as a lookup table, for example.

Classification threshold determiner 204 determines the second classification threshold based on the classification probability values of the plurality of unit classes, which have been calculated by classification probability calculator 203. To be more specific, classification threshold determiner 204 obtains the classification probability values of the plurality of unit classes, and determines the second classification threshold based on a classification result obtained using the second classification threshold for each of the obtained classification probability values of the plurality of unit classes. For example, classification threshold determiner 204 reads out the data set for evaluation from storage 201, and determines the second classification threshold based on the correct answer data in the data set for evaluation and the classification probability values of the plurality of unit classes which have been calculated by classification probability calculator 203. In other words, classification threshold determiner 204 determines an optimal second classification threshold based on the data set for evaluation. For example, classification threshold determiner 204 determines the second classification threshold in accordance with a false positive (FP)/false negative (FN) ratio with respect to the data set for evaluation, for each classification probability value of the plurality of unit classes.

Note that the second classification threshold may be set to a predetermined value, or may be determined in accordance with a target accuracy set by a user. When the second classification threshold is determined in accordance with the target accuracy, classification threshold determiner 204 may determine the second classification threshold so that a result obtained by applying the second classification threshold to the classification probability values of the plurality of unit classes satisfies a target threshold. Note that the target accuracy may be set on a class-by-class basis, or may be set to be common across all classes. This method will be described in detail later in the section pertaining to threshold calculation device operations.

Note that the second classification threshold may be a different value for each of the plurality of unit classes, or may be the same value for all the plurality of unit classes.

Threshold converter 205 performs a second transform, which is a transform from the second classification threshold into the first classification threshold for classifying the data into at least one of a plurality of classes, and is an inverse transform of the first transform. In other words, threshold converter 205 converts the second classification threshold into a non-normalized threshold (i.e., the first classification threshold) by performing an inverse transform. Threshold converter 205 may be an inverse function of a function constituting classification probability calculator 203 (e.g., an inverse-transformable probability function), or may be a database corresponding to computations made using an inverse function of an inverse-transformable probability function. The database may be a table in which inputs and outputs (post-inverse transform values) are mapped to each other, such as a lookup table, for example.

The first classification threshold is used in information processing device 100a for classifying the data into at least one of the plurality of classes. Information processing device 100a can execute the processing of classifying the data into classes by using a non-normalized threshold (the first classification threshold). Accordingly, with information processing device 100a, the classification process can be executed based on feature amounts extracted from the data, which eliminates the need for normalization processing and makes it possible to reduce the amount of computations.

Note that the first classification threshold may be set to a different value for each of the plurality of classes, or may be set to a value which is common for all of the plurality of classes.

First outputter 206 outputs the first classification threshold. More specifically, first outputter 206 outputs the first classification threshold to first obtainer 103 of information processing device 100a through communication. The communication may be wireless communication such as Wi-Fi (registered trademark) or Bluetooth (registered trademark), or wired communication such as Ethernet (registered trademark), for example.

Note that threshold calculation device 200a may include a trainer (not shown) for training a machine learning model. The trainer may include storage (not shown) that holds a data set for training. The data set for training includes a set of input data and correct answer data, stored in advance. The trainer may update the data set for training by obtaining new data for training from a database located on the server connected over a communication network such as the Internet. Additionally, the trainer may include a holder (not shown) that holds the same classification model as first calculator 202, and the holder may further hold the same N single-class classification probability calculators as classification probability calculator 203. The trainer trains the same classification model as first calculator 202 by using the data set for training. Furthermore, the trainer may train a network having N single-class classification probability calculators provided by classification probability calculator 203. Once the training of the classification model and the network ends, the trainer may output the trained classification model to first calculator 202, and update first calculator 202 to the trained classification model. Likewise, the trainer may output the trained network having the N single-class classification probability calculators to classification probability calculator 203, and update classification probability calculator 203 to the trained network.

Information Processing Device

Information processing device 100a will be described next. Information processing device 100a is a device that, for example, classifies data obtained by a sensor into at least one of a plurality of classes and outputs a classification result. The following will describe an example in which the data is an image. Note that the data, and the sensor that obtains the data, have already been described in the overview of information processing system 300a, and will therefore not be described here.

As illustrated in FIG. 1, information processing device 100a includes first obtainer 103, second obtainer 101, second calculator 102, threshold processor 104, and second outputter 105.

First obtainer 103 obtains the first classification threshold output from first outputter 206 of threshold calculation device 200a, and outputs the obtained first classification threshold to threshold processor 104, through communication. The communication has already been described above, and will therefore not be mentioned here. Note that the first classification threshold may be stored in advance in storage included in information processing device 100a.

Second obtainer 101 obtains the data from the sensor through communication. Here, the sensor is an image sensor, and the data is an image. Second obtainer 101 outputs the obtained data to second calculator 102. Note that the communication may be wireless communication or wired communication. Additionally, the sensor is not limited to a single sensor, and the data may be obtained by synchronizing two or more sensors, for example. Additionally, second obtainer 101 may obtain the data through removable memory. The removable memory is, for example, USB (Universal Serial Bus) memory.

Second calculator 102 is a feature amount extractor that extracts a feature amount of the data, e.g., a machine learning model. For example, second calculator 102 is a trained classification model. The classification model is a multilayer neural network (DNN). The data obtained by first obtainer 103 is input to second calculator 102. Second calculator 102 outputs a plurality of scalars corresponding to the plurality of classes of the data. Each scalar is a feature amount that corresponds to a respective class of the data. The output of second calculator 102 is a non-normalized value.

Note that second calculator 102 is not limited to a DNN. For example, second calculator 102 may be a feature amount extractor, aside from a DNN, that uses a method such as feature point extraction (e.g., edge extraction), primary component analysis, block matching, or a sampling moiré method.

Threshold processor 104 obtains the first classification threshold output from first obtainer 103, and classifies the data into at least one of a plurality of classes based on the output of second calculator 102 and the first classification threshold. To be more specific, threshold processor 104 classifies the data into at least one of the plurality of classes by determining whether or not a probability value for each of the plurality of classes, output from second calculator 102, is at least the first classification threshold. The first classification threshold may be set to a different value for each of the plurality of classes, or may be set to a value which is common for all of the plurality of classes. The specific operations performed by threshold processor 104 will be described later.

Second outputter 105 outputs a data classification result. Second outputter 105 may output the data classification result to a presenter (not shown), or to another device aside from information processing device 100a. For example, second outputter 105 may cause the presenter to present information based on the classification result, on the basis of a user operation input to an inputter (not shown). The inputter is, for example, a keyboard, a mouse, a touch panel, a button, a microphone, or the like. The presenter is, for example, a display, a speaker, or the like. Note that information processing device 100a may or may not include the inputter and the presenter. The inputter and the presenter may be provided in another device aside from information processing device 100a, for example. The other device aside from information processing device 100a may be, for example, an information terminal such as a smartphone, a tablet, a computer, or the like. Additionally, although information processing device 100a has been described as a computer as an example, information processing device 100a may be provided in a server connected over a communication network such as the Internet.

Note that like threshold calculation device 200a, information processing device 100a may include a trainer (not shown) for training a machine learning model. With respect to the details of the trainer, the same descriptions as those given of the trainer of threshold calculation device 200a may be applied, with the exception that training of the network of classification probability calculator 203 is not included, and first calculator 202 is replaced with second calculator 102.

Note that information processing system 300a may include a trainer (not shown) that is shared by threshold calculation device 200a and information processing device 100a, and that trainer may train the classification model of first calculator 202, the network of classification probability calculator 203, and the classification model of second calculator 102.

Operations of Threshold Calculation Device

Figure 2:
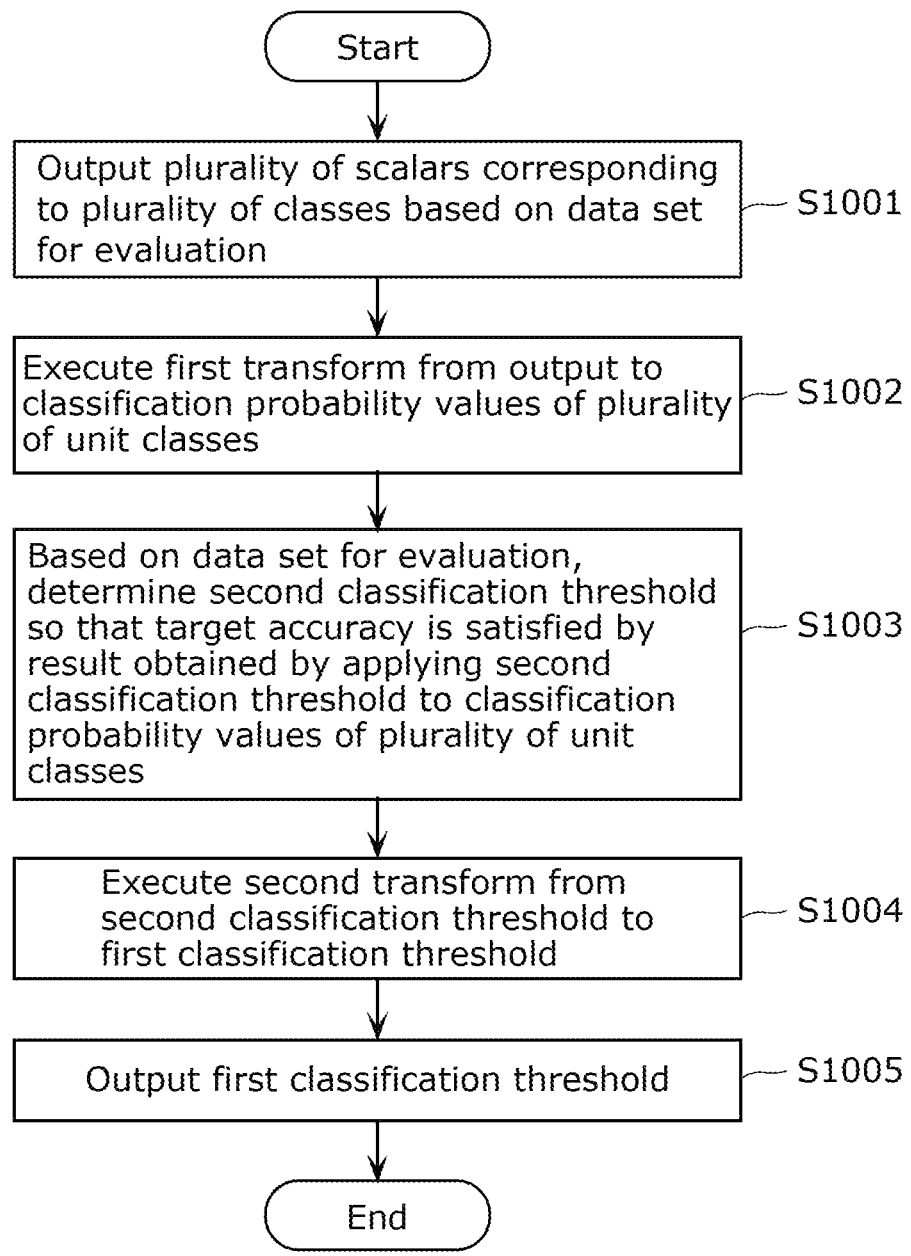
FIG. 2 is a flowchart illustrating an example of operations of a threshold calculation device according to Embodiment 1.

Operations performed by threshold calculation device 200a will be described next with reference to FIG. 2. FIG. 2 is a flowchart illustrating an example of operations of threshold calculation device 200a according to Embodiment 1.

First calculator 202 reads out the input data of the data set for evaluation from storage 201, and outputs a plurality of scalars corresponding to the plurality of classes of the input data (step S1001). The plurality of scalars corresponding to the plurality of classes of the input data are feature amounts corresponding to each of the plurality of classes of the input data. Assume, for example, that the input data is an image, and an automobile and a motorcycle appear in the image. Assume also that the plurality of classes are, for example, "pedestrian", "automobile", "motorcycle", "bicycle", and "background". At this time, first calculator 202 outputs a vector having a plurality of scalars corresponding to the plurality of classes in the input data (pedestrian, automobile, motorcycle, bicycle, background)=(0.1, 90, 60, 0.01, 0.001).

Next, classification probability calculator 203 performs the first transform, which is a transform of the output of first calculator 202 to classification probability values of the plurality of unit classes (step S1002). As described above, classification probability calculator 203 includes classification probability calculators of a plurality of unit classes. The classification probability calculator of each unit class is an inverse-transformable probability function. The classification probability calculators of the unit classes may be mutually-different functions, or may be the same function. Additionally, the classification probability calculators of the unit classes may be a database in which those calculators are associated with computations performed by inverse-transformable probability functions. A threshold calculator in each unit class converts the scalar for each of the plurality of classes into a value in a range from 0 to 1 through a reversible transform (i.e., normalizes the scalar). For example, when the scalars of (pedestrian, automobile, motorcycle, bicycle, background)=(0.1, 90, 60, 0.01, 0.001), which is the output of first calculator 202, are input to the classification probability calculators of the unit classes corresponding to each class, the classification probability calculator of each unit class converts that scalar into a value in a range from 0 to 1. Classification probability calculator 203 outputs (pedestrian, automobile, motorcycle, bicycle, background)=(0.3, 1.0, 1.0, 0.1, 0), which are the classification probability values of the plurality of unit classes. Here, "normalization" refers not to adding a plurality of scalar values to adjust the values to 1, but rather to converting the scalar values to values in a range from 0 to 1 in accordance with the magnitudes of those scalar values. The transform coefficient used at this time may be adjusted in accordance with the classification accuracy of each class.

Next, classification threshold determiner 204 sets the second classification threshold based on the classification probability values of the plurality of unit classes, which have been derived in step S1002 (step S1003). To be more specific, classification threshold determiner 204 obtains the classification probability values of the plurality of unit classes, and determines the second classification threshold based on a classification result obtained using the second classification threshold for each of the obtained classification probability values of the plurality of unit classes. For example, classification threshold determiner 204 reads out the data set for evaluation from storage 201, and determines the second classification threshold based on the correct answer data in the data set for evaluation and the classification probability values of the plurality of unit classes. For example, classification threshold determiner 204 may determine the second classification threshold in accordance with a false positive (FP)/false negative (FN) ratio with respect to the data set for evaluation, for each classification probability value of the plurality of unit classes. Additionally, for example, the second classification threshold may be determined so that a result obtained by applying the second classification threshold to the outputs of the plurality of unit classes (i.e., the classification probability values) satisfies a target accuracy. To be more specific, a target accuracy may be provided; classification accuracies for when the threshold of the classification probability values of the plurality of unit classes (the second classification threshold) is shifted may be calculated; a threshold at which the calculated classification accuracy is closest to the target accuracy may be selected; and that threshold may be determined as the second classification threshold. Alternatively, for example, the first threshold at which the calculated classification accuracy exceeds the target accuracy may be determined as the second classification threshold, instead of the threshold at which the calculated classification accuracy is closest to the target accuracy. The target accuracy may, for example, be set on a class-by-class basis, or may be set to be common across all classes. Note that the second classification threshold may be a different value for each of the plurality of unit classes, or may be the same value for all the plurality of unit classes.

Next, threshold converter 205 performs a second transform, which is a transform from the second classification threshold set by classification threshold determiner 204 into the first classification threshold for classifying the data into at least one of a plurality of classes, and is an inverse transform of the first transform (step S1004). Through this, a non-normalized threshold (here, the first classification threshold) can be obtained from a normalized threshold (here, the second classification threshold). The first classification threshold is a threshold for classifying the data into at least one of a plurality of classes. The first classification threshold may be set to a different value for each of the classes, or may be set to a value which is common for all of the plurality of classes. For example, if threshold converter 205 is an inverse function of the function constituting classification probability calculator 203 (e.g., an inverse-transformable probability function), threshold converter 205 inputs the second classification threshold derived in step S1003 and calculates the first classification threshold by inverse-transforming the second classification threshold. Additionally, if threshold converter 205 is a database corresponding to computations performed by an inverse function of the function constituting classification probability calculator 203 (e.g., a table in which inputs and outputs are mapped to each other, such as a lookup table), when the second classification threshold is input to threshold converter 205, the first classification threshold associated with the input is output.

Next, first outputter 206 outputs the first classification threshold derived in step S1004 to information processing device 100a (step S1005). At this time, first outputter 206 may be communicably connected to information processing device 100a. The communication method has already been described above, and will therefore not be mentioned here.

Operations of Information Processing Device

Figure 3:
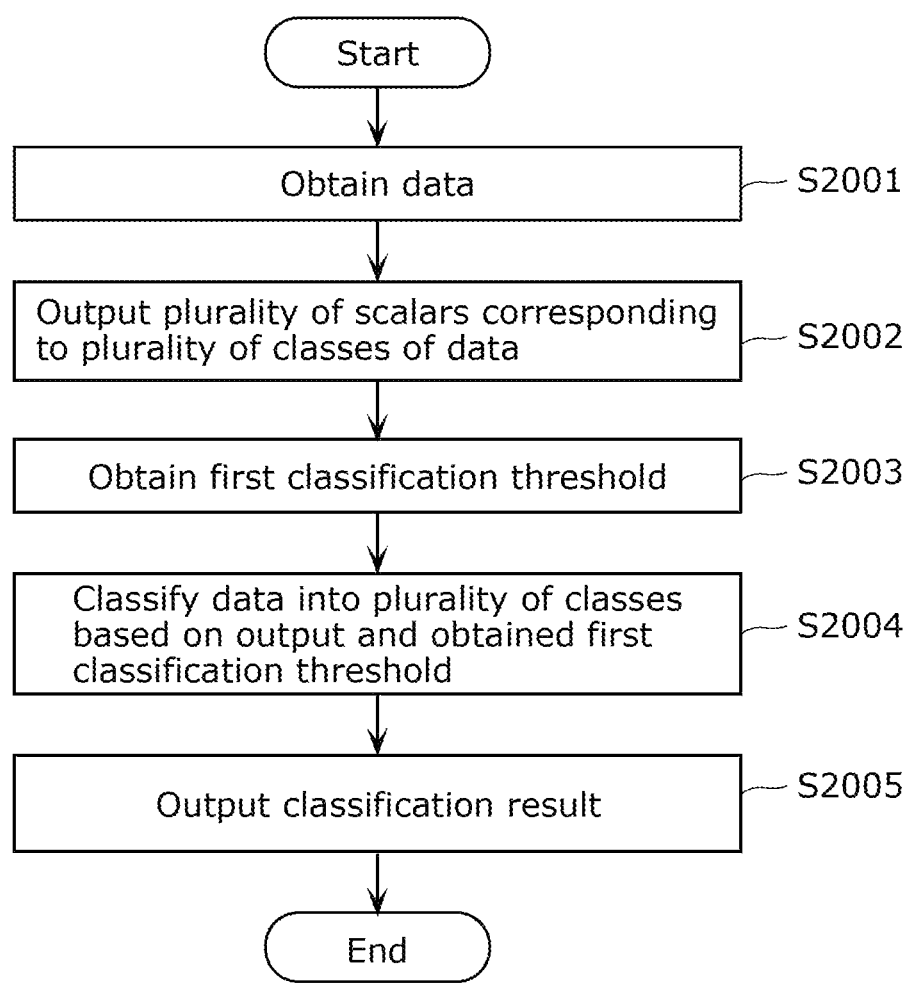
FIG. 3 is a flowchart illustrating an example of operations performed by an information processing device according to Embodiment 1.

Operations performed by information processing device 100a will be described next with reference to FIG. 3. FIG. 3 is a flowchart illustrating an example of operations performed by information processing device 100a according to Embodiment 1.

Second obtainer 101 obtains data from, for example, a sensor such as an image sensor (not shown) (step S2001). An example in which the data is in image will be described here. The image may be a moving image, or may be a still image (also called simply an "image"). Second obtainer 101 may be communicably connected to the sensor, or may obtain a plurality of images from the sensor through removable memory, e.g., USB (Universal Serial Bus) memory. The communication method has already been described above, and will therefore not be mentioned here.

Second calculator 102 outputs a plurality of scalars corresponding to the plurality of classes of the data obtained in step S2001 (step S2002). The data may be, for example, a moving image captured by an in-vehicle camera, or may be an image. When the data is a moving image, the following operations are executed for each of a plurality of frames constituting the moving image. Like the operation of first calculator 202 of threshold calculation device 200a, second calculator 102 outputs a plurality of scalars (feature amounts) from the obtained data. The following will describe an example in which the output of second calculator 102 is (pedestrian, automobile, motorcycle, bicycle, background)=(70, 90, 0.5, 60, 0.001).

First obtainer 103 obtains the first classification threshold output from threshold calculation device 200a (step S2003). At this time, first obtainer 103 obtains the first classification threshold from threshold calculation device 200a through communication. The first classification threshold and the communication method have already been described above, and will therefore not be mentioned here. It is assumed here that the first classification threshold is (pedestrian, automobile, motorcycle, bicycle, background)=(60, 60, 60, 60, 60).

Threshold processor 104 classifies the data obtained by second obtainer 101 into at least one of the plurality of classes based on the output of second calculator 102 and the first classification threshold obtained by first obtainer 103 (step S2004). To be more specific, in step S2004, threshold processor 104 classifies the data into at least one of the plurality of classes by determining whether or not each of the plurality of scalars corresponding to the plurality of classes in the data is greater than or equal to the first classification threshold.

For example, when the output of second calculator 102 is (pedestrian, automobile, motorcycle, bicycle, background)= (70, 90, 0.5, 60, 0.001), and the first classification threshold for each class is (pedestrian, automobile, motorcycle, bicycle, background)=(60, 60, 60, 60, 60), the scalar values for three of the classes are at least the first classification threshold. At this time, threshold processor 104 may classify the image into the three classes, i.e., pedestrian, automobile, and bicycle, or into a single class. In the latter case, of probability values corresponding to the three classes of the image, threshold processor 104 may select the class having the highest scalar value and classify that image into a single class. In this case, of the scalar values for the aforementioned three classes, the probability value is highest for the automobile class, and thus threshold processor 104 classifies that image into the automobile class. However, of the scalar values for the three classes, threshold processor 104 may select a class having a scalar value which has the greatest difference from the first classification threshold, and may classify the image into a single class. In this case, threshold processor 104 may classify that image into the automobile class. Thus as described above, the method for classifying the data may be set as appropriate in accordance with the type of the data and the purpose of the classification.

Second outputter 105 outputs the classification result obtained in step S2004 (step S2005). Second outputter 105 may output the classification result to a presenter (not shown), or to another device aside from information processing device 100a. For example, second outputter 105 may cause the presenter to present information based on the classification result, on the basis of a user operation input to an inputter (not shown). The inputter, the presenter, the other device, and the like have been described above, and will therefore not be mentioned here.

With respect to information based on the classification result, the classification result may be presented in a variety of formats based on settings input to the inputter. For example, if the data is an image captured by an in-vehicle camera, the information based on the classification result may be a type and number of detections of an object class detected by information processing device 100a, a recognition accuracy for each of object classes, a change in recognition accuracy for each of object classes depending on the weather or time of day, trends of images having low recognition accuracy, advice for avoiding danger, or the like. Information processing device 100a may, for example, transmit an analysis result to a database located in a server connected over the Internet, and obtain information based on the analysis result.

Variation

An information processing device according to a variation on Embodiment 1 will be described next. The following descriptions will focus on the differences from Embodiment 1, and descriptions of common points will be omitted or simplified.

Overview of Information Processing Device

Figure 4:
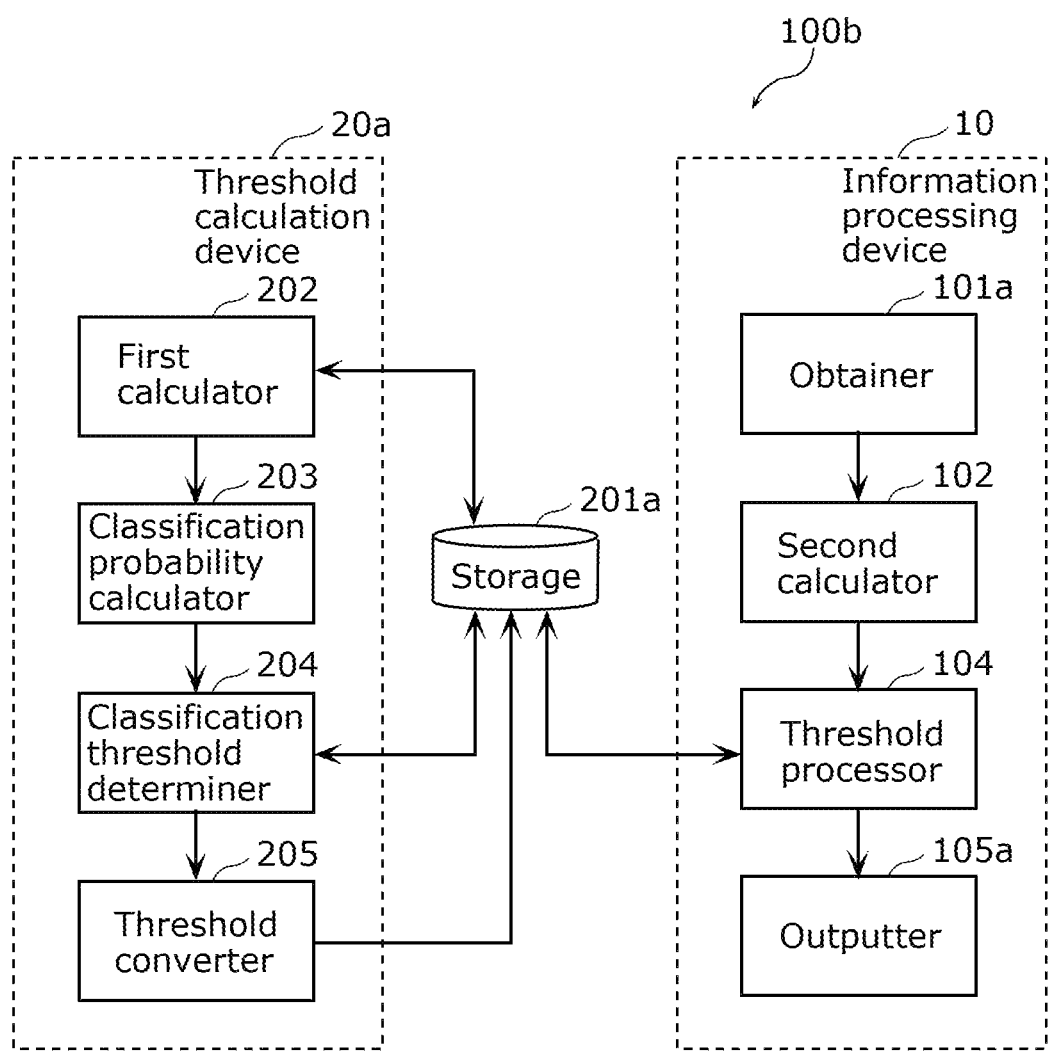
FIG. 4 is a block diagram illustrating an example of the configuration of an information processing device according to a variation on Embodiment 1.

FIG. 4 is a block diagram illustrating an example of the configuration of information processing device 100b according to the variation on Embodiment 1. Information processing device 100b includes threshold calculator 20a, storage 201a, and information processor 10.

Embodiment 1 described an example in which information processing device 100a obtains the first classification threshold from threshold calculation device 200a and classifies data into at least one of a plurality of classes using the obtained first classification threshold. The main difference between information processing device 100b and information processing device 100a according to Embodiment 1 is that information processing device 100b includes threshold calculator 20a. Note that in FIGS. 1 and 4, constituent elements which are substantially identical are given the same reference signs.

As illustrated in FIG. 1, in Embodiment 1, threshold calculation device 200a outputs the first classification threshold derived by threshold converter 205 to first outputter 206, and the first classification threshold is output to information processing device 100a via first outputter 206. In the present variation, as illustrated in FIG. 4, threshold calculator 20a stores the first classification threshold derived by threshold converter 205 in storage 201a. Then, information processor 10 reads out the first classification threshold stored in storage 201a.

As illustrated in FIGS. 1 and 4, obtainer 101a illustrated in FIG. 4 corresponds to second obtainer 101 illustrated in FIG. 1, and outputter 105a illustrated in FIG. 4 corresponds to second outputter 105 illustrated in FIG. 1. In other words, like second obtainer 101, obtainer 101a obtains data from a sensor such as an image sensor. Additionally, like second outputter 105, outputter 105a outputs a classification result of classifying the data obtained by obtainer 101a into at least one of a plurality of classes.

Operations of Threshold Calculator

Figure 5:
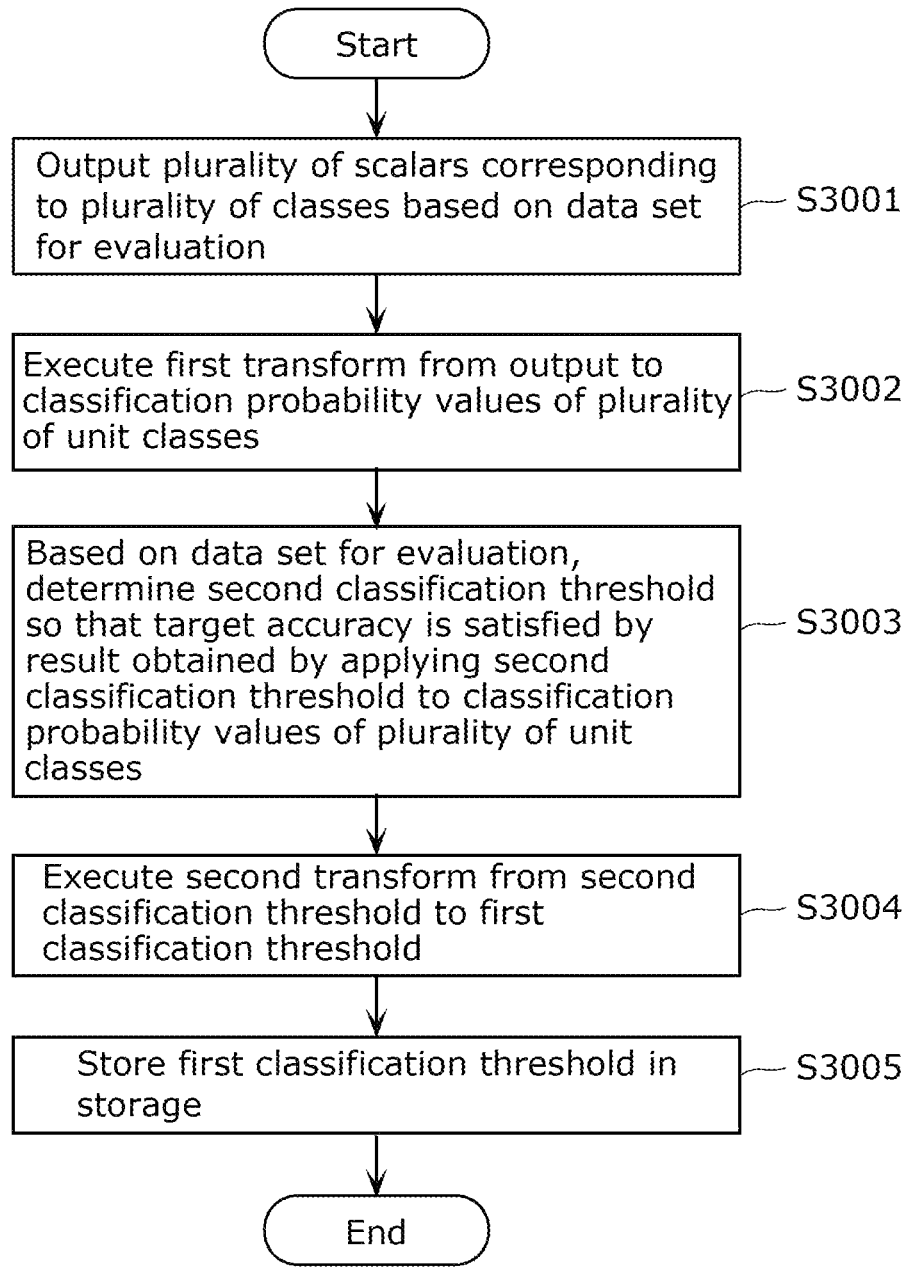
FIG. 5 is a flowchart illustrating an example of operations of a threshold calculator according to a variation on Embodiment 1.

FIG. 5 is a flowchart illustrating an example of operations of threshold calculator 20a according to a variation on Embodiment 1. Steps S3001 to S3004 in FIG. 5 correspond to steps S1001 to S1004 in FIG. 2, respectively, and the descriptions thereof will therefore be simplified here. Note that the operations of threshold calculator 20a according to the variation differ from the operations of threshold calculation device 200a according to Embodiment 1 in that the first classification threshold is stored in storage 201a.

First calculator 202 reads out the input data of the data set for evaluation from storage 201, and outputs a plurality of scalars corresponding to the plurality of classes of the input data (step S3001).

Next, classification probability calculator 203 performs the first transform, which is a transform of the output of first calculator 202 to classification probability values of the plurality of unit classes (step S3002).

Next, classification threshold determiner 204 sets the second classification threshold based on the classification probability values of the plurality of unit classes, which have been derived in step S3002 (step S3003).

Next, threshold converter 205 performs a second transform on the second classification threshold, which is a transform from the second classification threshold set by classification threshold determiner 204 into the first classification threshold for classifying the data into at least one of a plurality of classes, and is an inverse transform of the first transform (step S3004).

Next, threshold converter 205 stores the first classification threshold in storage 201a (step S3005).

Operations of Information Processor

Figure 6:
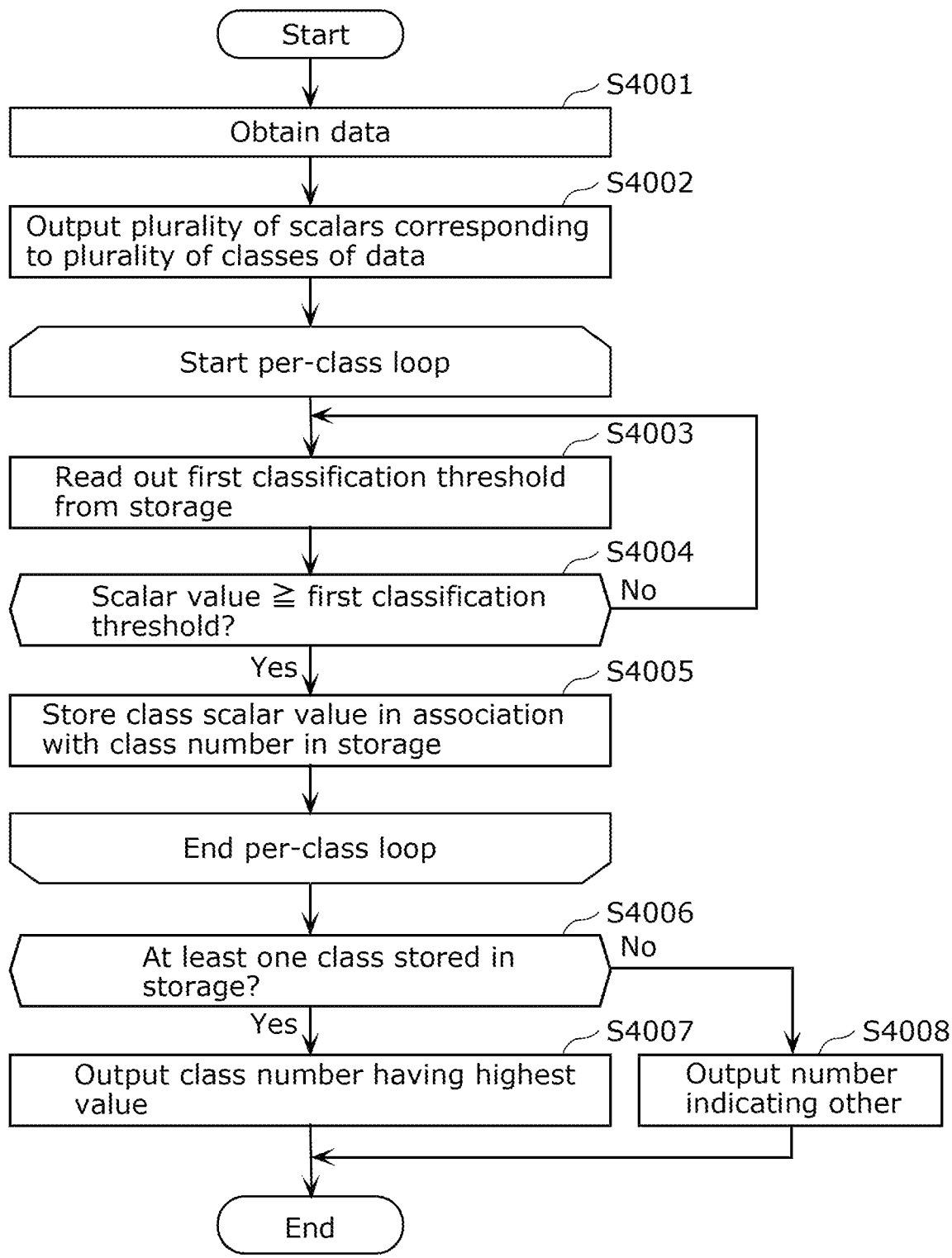
FIG. 6 is a flowchart illustrating an example of operations of an information processor according to a variation on Embodiment 1.

FIG. 6 is a flowchart illustrating an example of operations of information processor 10 according to the variation on Embodiment 1. Steps S4001 and S4002 in FIG. 6 correspond to steps S2001 and S2002 in FIG. 3, respectively, and the descriptions thereof will therefore be simplified here.

Obtainer 101a obtains data from, for example, a sensor such as an image sensor (step S4001). Next, second calculator 102 outputs a plurality of scalars (probability values) corresponding to the plurality of classes of the data obtained in step S4001 (step S4002).

A per-class loop process is then started for each of the plurality of classes of the data.

Threshold processor 104 reads out the first classification threshold stored in storage 201a (step S4003). Although an example in which threshold processor 104 reads out the first classification threshold for each of the plurality of classes for each classification process of each class will be described here, threshold processor 104 may read out the first classification values for all of the plurality of classes at once. Note that the first classification threshold may be a different value for each of the plurality of unit classes, or may be the same value.

Threshold processor 104 classifies the data obtained by second obtainer 101 into at least one of the plurality of classes based on the output of second calculator 102 and the first classification threshold read out from storage 201a. First, threshold processor 104 reads out the first classification threshold of one of the plurality of classes (e.g., a pedestrian class) from storage 201a (step S4003), and then determines whether or not the scalar value of that class is at least the first classification threshold read out from storage 201a (step S4004). If the scalar value of that class is at least the first classification threshold (Yes in step S4004), threshold processor 104 saves the scalar value of that class in association with a number indicating the class in storage 201a (step S4005).

On the other hand, if the scalar value of the class is less than the first classification threshold (No in step S4004), threshold processor 104 reads out the first classification threshold of another class (e.g., an automobile class) in the plurality of classes from storage 201a (step S4003). Threshold processor 104 then determines whether or not the scalar value of that class is at least the first classification threshold read out from storage 201a (step S4004). If the scalar value of that class is at least the first classification threshold (Yes in step S4004), threshold processor 104 stores the scalar value of that class in association with a number indicating the class in storage 201a (step S4005).

On the other hand, if the scalar value of the class is less than the first classification threshold (No in step S4004), threshold processor 104 reads out another class (e.g., a motorcycle class) in the plurality of classes from storage 201a (step S4003), and executes the determination processing of step S4004. By repeating the same processing in this manner, the classification processing can be executed on a class-by-class basis for a plurality of scalars corresponding to a plurality of classes of data. Once the per-class loop processing ends, threshold processor 104 determines whether or not the number of classes stored in storage 201*a* is at least 1 (step S4006). If the number of classes stored in storage 201*a* is at least 1 (Yes in step S4006), threshold processor 104 outputs, to outputter 105*a*, the class number having the highest scalar value (step S4007). In this manner, based on the class number, outputter 105*a* outputs (not shown) a classification result (e.g., that the data indicates an automobile) In which the data has been classified into at least one of a plurality of classes.

On the other hand, if the number of classes stored in storage 201*a* is 0 (No in step S4006), threshold processor 104 outputs, to outputter 105*a*, a number indicating "other" (step S4008). "Other" indicates that there is no corresponding class. At this time, the classification result output from outputter 105*a* may, for example, indicate that the data belongs to another class, or that the data belongs to a background class.

Embodiment 2

Figure 7:
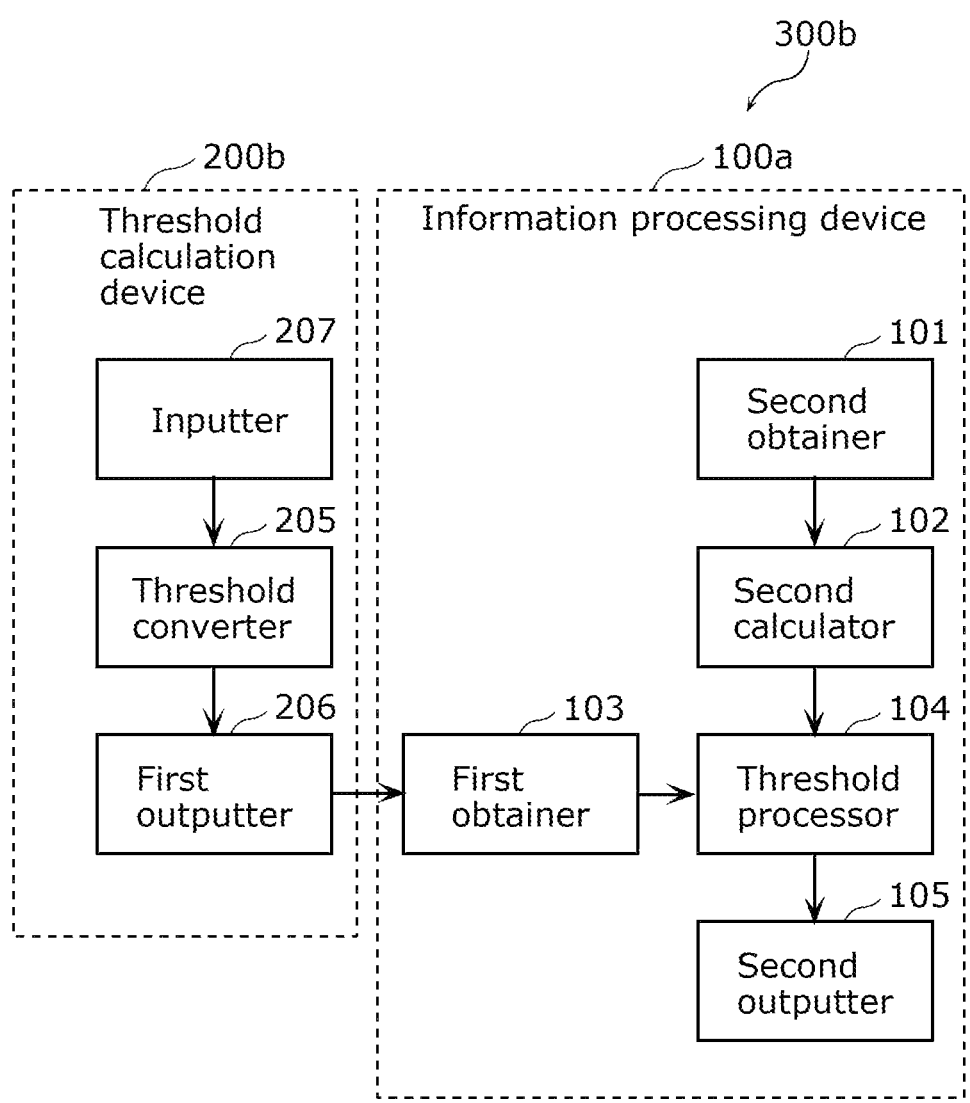
FIG. 7 is a block diagram illustrating an example of the configuration of an information processing system according to Embodiment 2.

An information processing system according to Embodiment 2 will be described next. The following descriptions will focus on the differences from Embodiment 1, and descriptions of common points will be omitted or simplified.
Overview of Information Processing System FIG. 7 is a block diagram illustrating an example of the configuration of information processing system 300*b* according to Embodiment 2. Information processing system 300*b* includes threshold calculation device 200*b* and information processing device 100*a*. The main difference between threshold calculation device 200*b* according to Embodiment 2 and threshold calculation device 200*a* according to Embodiment 1 is that the first classification threshold is derived from the second classification threshold, which has been set by a user.
Configuration of Threshold Calculation Device The configuration of threshold calculation device 200*b* will be described next.

As illustrated in FIG. 7, threshold calculation device 200*b* includes inputter 207, threshold converter 205, and first outputter 206. Although an example in which threshold calculation device 200*b* includes inputter 207 will be described here, the configuration is not limited thereto. For example, the inputter may be provided in another device aside from threshold calculation device 200*b*. The other device is, for example, a tablet terminal, a smartphone, a computer, or the like.

Inputter 207 inputs an operation signal from a user into threshold converter 205. Inputter 207 is, for example, a touch panel, a keyboard, a mouse, a button, a speaker, or the like. The operation signal is, for example, a signal indicating the second classification threshold for each of the plurality of classes. The user inputs the second classification threshold into threshold converter 205 through inputter 207. Note that the second classification threshold may be a value set in advance.

Threshold converter 205 derives the first classification threshold by performing a second transform, which is an inverse transform of the first transform, on the obtained second classification threshold. First outputter 206 outputs the first classification threshold to information processing device 100*a*.

Figure 8:
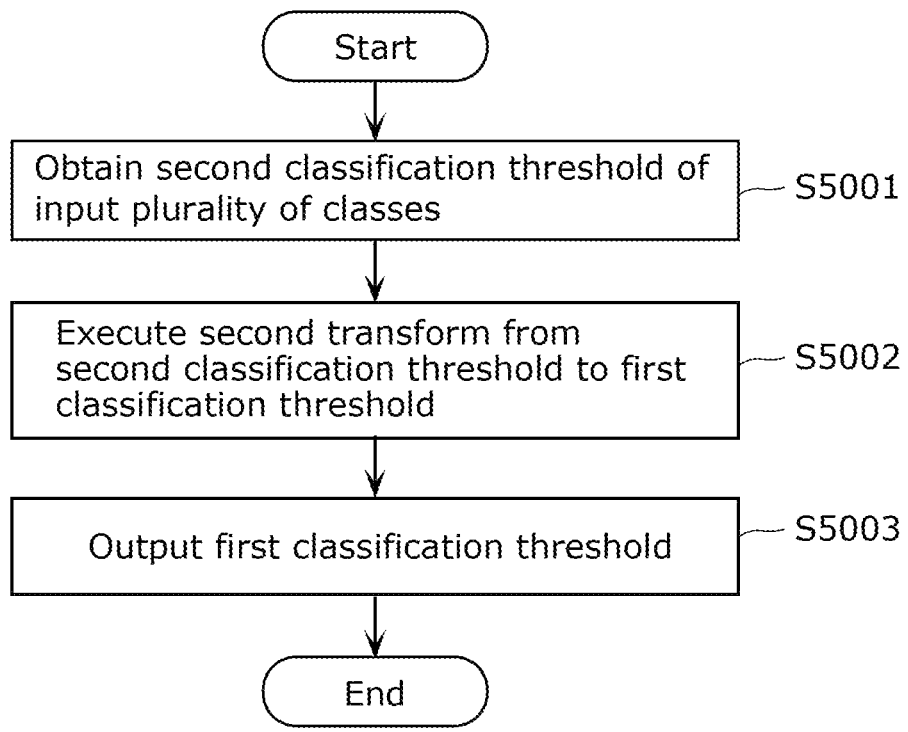
FIG. 8 is a flowchart illustrating an example of operations of a threshold calculation device according to Embodiment 2.

Note that information processing device 100*a* is the same as information processing device 100*a* according to Embodiment 1, and will therefore not be described here.
Operations of Threshold Calculation Device Operations of threshold calculation device 200*b* will be described next. FIG. 8 is a flowchart illustrating an example of operations of threshold calculation device 200*b* according to Embodiment 2.

Although not illustrated here, the user inputs the second classification threshold for each of the plurality of classes to threshold converter 205 through inputter 207.

As illustrated in FIG. 8, threshold converter 205 obtains the second classification threshold for each of the plurality of classes, input through inputter 207 (step S5001). Next, threshold converter 205 performs a second transform on the second classification threshold, which is a transform from the obtained second classification threshold into the first classification threshold for classifying the data into at least one of a plurality of classes, and is an inverse transform of the first transform (step S5002).

First outputter 206 outputs the first classification threshold to information processing device 100*a* (step S5003).

Figure 9:
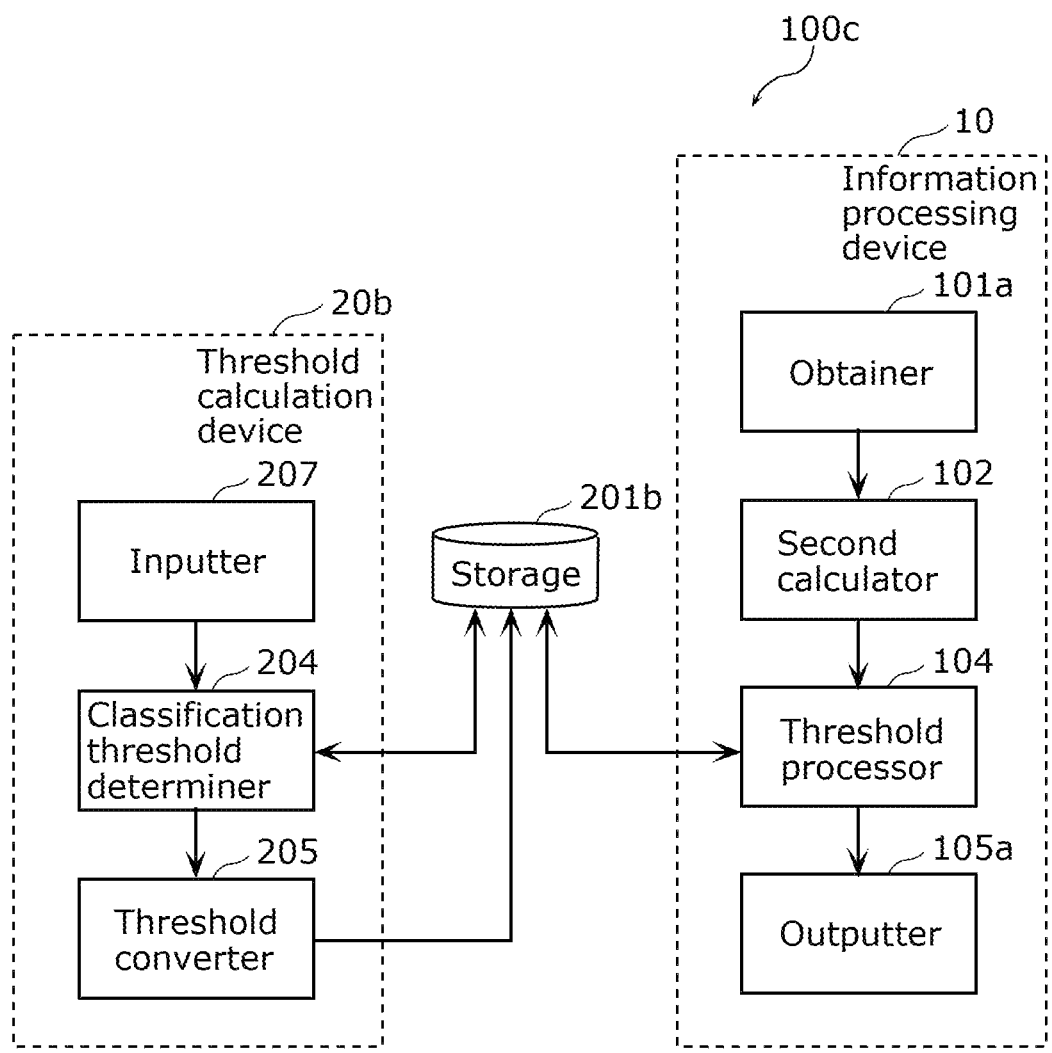
FIG. 9 is a block diagram illustrating an example of the configuration of an information processing device according to a variation on Embodiment 2.

Note that the operations of information processing device 100*a* are the same as in the example described in Embodiment 1, and will therefore not be described here.
Variation An information processing device according to a variation on Embodiment 2 will be described next. The following descriptions will focus on the differences from Embodiment 2, and descriptions of common points will be omitted or simplified.
Overview of Information Processing Device FIG. 9 is a block diagram illustrating an example of the configuration of information processing device 100*c* according to the variation on Embodiment 2. Information processing device 100*b* includes threshold calculator 20*b*, storage 201*b*, and Information processor 10.

Embodiment 2 described an example in which Information processing device 100*a* obtains the first classification threshold from threshold calculation device 200*b* and classifies data into at least one of a plurality of classes using the obtained first classification threshold. The main difference between information processing device 100*c* according to the present variation and information processing device 100*a* according to Embodiment 2 is that information processing device 100*c* includes threshold calculator 20*b*. Additionally, the main difference between threshold calculator 20*b* according to the present variation and threshold calculation device 200*b* according to Embodiment 2 is that threshold calculator 20*b* includes classification threshold determiner 204. Note that in FIGS. 7 and 9, constituent elements which are substantially identical are given the same reference signs.

As illustrated in FIG. 7, in Embodiment 2, threshold calculation device 200*b* derives the first classification threshold by using threshold converter 205 to perform an inverse transform on the second classification threshold input by the user to threshold converter 205 through inputter 207. Then, threshold calculation device 200*b* outputs the derived first classification threshold from first outputter 206 to information processing device 100. In the present variation, as illustrated in FIG. 9, threshold calculator 20*b* stores the first classification threshold derived by threshold converter 205 in storage 201*b*. Then, information processor 10 reads out the first classification threshold stored in storage 201*b*, and classifies the data into at least one of a plurality of classes.

As illustrated in FIGS. 7 and 9, obtainer 101*a* illustrated in FIG. 9 corresponds to second obtainer 101 illustrated in FIG. 7, and outputter 105*a* illustrated in FIG. 9 corresponds to second outputter 105 illustrated in FIG. 7. In other words, like second obtainer 101, obtainer 101a obtains data from a sensor such as an image sensor. Additionally, like second outputter 105, outputter 105a outputs a classification result of classifying the data obtained by obtainer 101a into at least one of a plurality of classes.

Additionally, as illustrated in FIGS. 1 and 9, classification threshold determiner 204 illustrated in FIG. 9 corresponds to classification threshold determiner 204 illustrated in FIG. 1. Classification threshold determiner 204 determines the appropriate second classification threshold by, for example, referring to a data set for evaluation stored in storage 201 or storage 201b.

Although threshold calculation device 200b according to Embodiment 2 derives the first classification threshold from the second classification threshold input by the user, threshold calculator 20b according to the present variation determines the second classification threshold based on the second classification threshold input by the user and the evaluation data stored in storage 201b. Details of the determination process will be described in the section regarding operations.

Note that information processor 10 is the same as information processor 10 according to the variation on Embodiment 1, and will therefore not be described here.

Operations of Threshold Calculator

Figure 10:
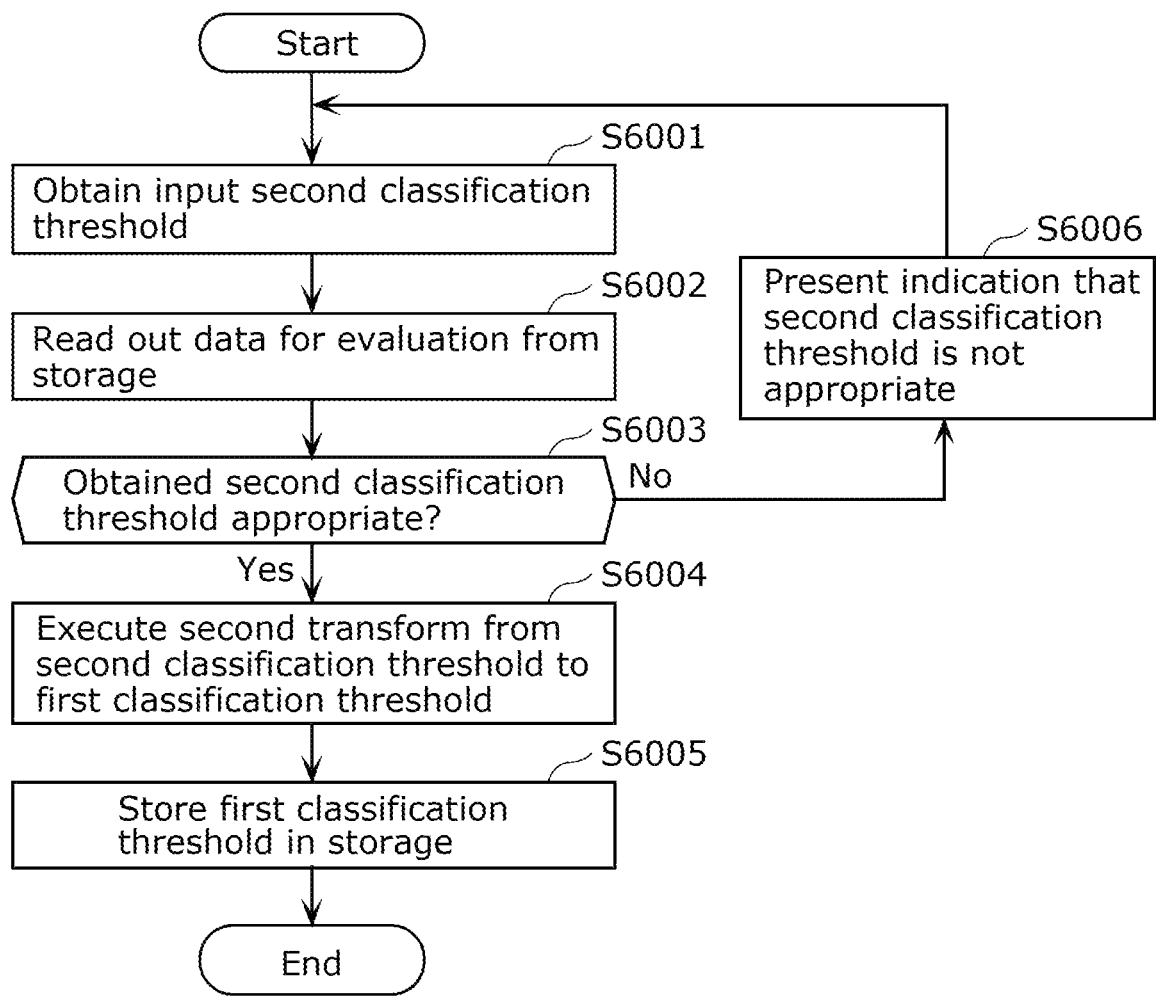
FIG. 10 is a flowchart illustrating an example of operations of a threshold calculator according to a variation on Embodiment 2.

FIG. 10 is a flowchart illustrating an example of operations of threshold calculator 20b according to a variation on Embodiment 2.

Although not illustrated here, the user Inputs the second classification threshold for each of the plurality of classes to classification threshold determiner 204 through inputter 207. Through this, as illustrated in FIG. 10, classification threshold determiner 204 obtains the input second classification threshold (step S6001).

Next, classification threshold determiner 204 reads out the evaluation data from storage 201b (step S6002). Based on the data set for evaluation, classification threshold determiner 204 determines whether or not the second classification threshold obtained in step S6001 is appropriate, and more specifically, whether or not a result obtained by applying the second classification threshold to the classification probability values of a plurality of unit classes in the data set for evaluation satisfies a target accuracy (step S6003). If it is determined that the second classification threshold is appropriate (Yes in step S6003), classification threshold determiner 204 outputs the second classification threshold to threshold converter 205. Threshold converter 205 performs a second transform on the second classification threshold, which is a transform from the obtained second classification threshold into the first classification threshold for classifying the data into at least one of a plurality of classes, and is an inverse transform of the first transform (step S6004). Threshold converter 205 stores the derived first classification threshold in storage 201b (step S6005).

On the other hand, if it is determined that the second classification threshold is not appropriate (No in step S6003), classification threshold determiner 204 causes a presenter (not shown) to present an indication that the second classification threshold is not appropriate (step S6006). At this time, classification threshold determiner 204 may cause the presenter to present the second classification threshold at which a result, obtained by applying the second classification threshold to the classification probability values of the plurality of unit classes in the data set for evaluation, satisfies the target accuracy.

Note that the operations of information processor 10 is the same as information processor 10 according to the variation on Embodiment 1, and will therefore not be described here.

Other Embodiments

Although one or more aspects of an information processing device and an information processing method have been described thus far on the basis of embodiments, the present disclosure is not intended to be limited to these embodiments. Variations on the present embodiment conceived by one skilled in the art and embodiments implemented by combining constituent elements from different other embodiments, for as long as they do not depart from the essential spirit thereof, fall within the scope of the present disclosure.

For example, the processing described in the foregoing embodiments may be implemented through centralized processing using a single device (system), or may be implemented through distributed processing using a plurality of devices. Additionally, a single processor or a plurality of processors may execute the above-described programs stored in the recoding medium. In other words, the processing may be centralized processing or distributed processing.

Additionally, many changes, substitutions, additions, omissions, and the like are possible for the foregoing embodiments without departing from the scope of the claims or a scope equivalent thereto.

INDUSTRIAL APPLICABILITY

The present disclosure is useful as an information processing device, an information processing method, and a recoding medium capable of reducing an amount of computations for classifying an object into a class.

The invention claimed is:

1. An information processing system comprising:
an information processing device including a first processor; and
a threshold calculating device including a second processor,
wherein the first processor is configured to:
obtain an image captured by a camera;
obtain a plurality of first classification thresholds outputted from the threshold calculating device, the plurality of first classification thresholds being a plurality of classification thresholds that are for classifying an object included in the image into at least one of a plurality of classes and correspond to the plurality of classes;
compare a plurality of first scalars and the plurality of first classification thresholds, wherein the plurality of first scalars are obtained by inputting the image into a first neural network that is a trained first classification model, wherein the plurality of first scalars correspond to the plurality of classes, wherein the plurality of first scalars are a plurality of scalars that are not transformed into classification probability values, and wherein the plurality of first classification thresholds correspond to the plurality of classes;
classify the object into, among the plurality of classes, at least one class having a corresponding first scalar that is greater than a corresponding first classification threshold; and
output, as a classification result, an information relating to the at least one class into which the object is classified,
wherein the second processor is configured to:

obtain a set of images for training that includes a plurality of images for training and a plurality of correct data items corresponding to the plurality of images for training;

train a second neural network using the image set for training, to output, from each of the plurality of images for training inputted, the plurality of first scalars corresponding to the plurality of classes, the second neural network being a classification model;

perform a first transform that transforms a plurality of second scalars into a plurality of classification probability values, the plurality of second scalars corresponding to the plurality of classes and being obtained by inputting an image for evaluation into the second neural network trained;

determine a plurality of second classification thresholds based on the plurality of classification probability values;

perform a second transform that is a transform from the plurality of second classification thresholds into the plurality of first classification thresholds and an inverse transform of the first transform; and output the plurality of first classification thresholds into which the plurality of second classification thresholds have been transformed by the second transform to the information processing device.

2. The information processing system according to claim 1, wherein the first transform is a computation by an inverse-transformable probability function, and the second transform is a computation by an inverse function of the inverse-transformable probability function.

3. The information processing system according to claim 1, wherein the first transform is a transform using a database corresponding to a computation by an inverse-transformable probability function, and the second transform is a transform using a database corresponding to a computation by an inverse function of the inverse-transformable probability function.

4. The information processing system according to claim 1, wherein the image for evaluation is a set of images for evaluation including a plurality of images for evaluation, the plurality of images for evaluation are inputted into the second neural network trained, to obtain, for each of the plurality of images for evaluation, a plurality of classification probability values corresponding to the plurality of classes, and the plurality of second classification thresholds are determined based on a classification result using the plurality of second classification thresholds based on the plurality of classification probability values obtained for each of the plurality of images for evaluation.

5. The information processing system according to claim 1, wherein the plurality of classes include a class corresponding to a person, a class corresponding to a vehicle, and a class different from the class corresponding to the person and the class corresponding to the vehicle.

6. An information processing method, wherein the information processing method causes a first processor of an information processing device to:

obtain an image captured by a camera;

obtain a plurality of first classification thresholds outputted from a threshold calculating device including a second processor, the plurality of first classification thresholds being a plurality of classification thresholds that are for classifying an object included in the image into at least one of a plurality of classes and correspond to the plurality of classes;

compare a plurality of first scalars and the plurality of first classification thresholds, wherein the plurality of first scalars are obtained by inputting the image into a first neural network that is a trained first classification model, wherein the plurality of first scalars correspond to the plurality of classes, wherein the plurality of first scalars are a plurality of scalars that are not transformed into classification probability values, and wherein the plurality of first classification thresholds correspond to the plurality of classes;

classify the object into, among the plurality of classes, at least one class having a corresponding first scalar that is greater than a corresponding first classification threshold; and output, as a classification result, an information relating to the at least one class into which the object is classified, wherein the information processing method further causes the second processor to:

obtain a set of images for training that includes a plurality of images for training and a plurality of correct data items corresponding to the plurality of images for training;

train a second neural network using the image set for training, to output, from each of the plurality of images for training inputted, the plurality of first scalars corresponding to the plurality of classes, the second neural network being a classification model;

perform a first transform that transforms a plurality of second scalars into a plurality of classification probability values, the plurality of second scalars corresponding to the plurality of classes and being obtained by inputting an image for evaluation into the second neural network trained;

determine a plurality of second classification thresholds based on the plurality of classification probability values;

perform a second transform that is a transform from the plurality of second classification thresholds into the plurality of first classification thresholds and an inverse transform of the first transform; and output the plurality of first classification thresholds into which the plurality of second classification thresholds have been transformed by the second transform to the information processing device.

* * * * *